US011862899B2

(12) United States Patent
Chua et al.

(10) Patent No.: US 11,862,899 B2
(45) **Date of Patent: *Jan. 2, 2024**

(54) CONNECTOR ASSEMBLY

(71) Applicant: Molex, LLC, Lisle, IL (US)

(72) Inventors: Yih-Ping Chua, New Taipei (TW); Yueh-Ting Chiang, New Taipei (TW)

(73) Assignee: Molex, LLC, Lisle, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/086,696

(22) Filed: Dec. 22, 2022

(65) Prior Publication Data

US 2023/0127481 A1 Apr. 27, 2023

Related U.S. Application Data

(63) Continuation of application No. 17/192,884, filed on Mar. 5, 2021, now Pat. No. 11,545,785, which is a (Continued)

(30) Foreign Application Priority Data

Jan. 25, 2019 (CN) ......................... 201910072565.3

(51) Int. Cl.
*H01R 13/6471* (2011.01)
*H01R 13/40* (2006.01)
(Continued)

(52) U.S. Cl.
CPC ......... *H01R 13/6471* (2013.01); *H01R 12/75* (2013.01); *H01R 13/40* (2013.01);
(Continued)

(58) Field of Classification Search
CPC .. H01R 13/6471; H01R 13/40; H01R 13/652; H01R 13/6581; H01R 13/6596;
(Continued)

(56) References Cited

U.S. PATENT DOCUMENTS 5,632,634 A 5/1997 Soes
6,004,150 A 12/1999 Chapman et al.
(Continued)

FOREIGN PATENT DOCUMENTS

CN 201178210 Y 1/2009
CN 201708323 U 1/2011
(Continued)

OTHER PUBLICATIONS

Notice of Allowance received for U.S. Appl. No. 16/746,960, dated Oct. 30, 2020, 9 Pages.

*Primary Examiner* — Gary F Paumen

(57) ABSTRACT

The present disclosure provides a connector assembly. The connector assembly includes a wire-end connector. The wire-end connector includes a wafer, a shield plate and a twin-ax cable. The wafer includes a frame and a terminal group. The terminal group is supported by the frame. The terminal group includes a signal terminal pair and a ground plate. The ground plate includes a ground terminal on both sides of the signal terminal pair. The shield plate is electrically connected to the ground plate. The shield plate includes an opening that penetrates the shield plate. The twin-ax cable includes a pair of conductors and a ground portion. The pair of conductors extend into the opening of the shield plate and are electrically connected to the signal terminal pair. The ground portion electrically connects at least one of the shield plate and the ground plate.

20 Claims, 16 Drawing Sheets

Related U.S. Application Data continuation of application No. 16/746,960, filed on Jan. 20, 2020, now Pat. No. 10,944,215.

(51) Int. Cl.

| | |
|---|---|
| ***H01R 13/652*** | (2006.01) |
| ***H01R 13/6581*** | (2011.01) |
| ***H01R 12/75*** | (2011.01) |
| ***H01R 13/502*** | (2006.01) |
| ***H01R 13/518*** | (2006.01) |
| ***H01R 13/629*** | (2006.01) |
| ***H01R 13/6596*** | (2011.01) |

(52) U.S. Cl.

CPC ......... *H01R 13/502* (2013.01); *H01R 13/518* (2013.01); *H01R 13/629* (2013.01); *H01R 13/652* (2013.01); *H01R 13/6581* (2013.01); *H01R 13/6596* (2013.01)

(58) Field of Classification Search

CPC .. H01R 13/502; H01R 13/518; H01R 13/629; H01R 13/6592; H01R 12/75; H01R 23/662; H01R 2103/00

See application file for complete search history.

(56) References Cited

U.S. PATENT DOCUMENTS

| | | | | |
|---|---|---|---|---|
| 6,217,372 | B1 | 4/2001 | Reed | |
| 6,380,485 | B1 | 4/2002 | Beaman et al. | |
| 6,489,563 | B1 | 12/2002 | Zhao et al. | |
| 7,118,409 | B2 | 10/2006 | Kuroda et al. | |
| 7,192,301 | B2 | 3/2007 | Kuroda et al. | |
| 7,497,724 | B1 | 3/2009 | Fong et al. | |
| 7,857,657 | B2 | 12/2010 | Kuwahara et al. | |
| 8,727,803 | B2 | 5/2014 | Kurachi | |
| 8,900,007 | B2 | 12/2014 | Nonen et al. | |
| 9,356,369 | B2 | 5/2016 | Tamai | |
| 9,735,495 | B2 | 8/2017 | Gross | |
| 10,944,215 | B2 * | 3/2021 | Chua ...................... | H01R 13/40 |
| 11,545,785 | B2 * | 1/2023 | Chua ...................... | H01R 12/75 |
| 2004/0185708 | A1 | 9/2004 | Kuwahara | |
| 2005/0191897 | A1 | 9/2005 | Kondou et al. | |
| 2007/0184710 | A1 | 8/2007 | Nagata et al. | |
| 2018/0323525 | A1 | 11/2018 | Wanha et al. | |

FOREIGN PATENT DOCUMENTS

| | | | |
|---|---|---|---|
| CN | 105556759 | A | 5/2016 |
| CN | 205646330 | U | 10/2016 |
| CN | 207868438 | U | 9/2018 |
| TW | I608679 | B | 12/2017 |
| WO | 2018170209 | A1 | 9/2018 |

* cited by examiner

4A

CONNECTOR ASSEMBLY

RELATED APPLICATIONS

This application is a continuation application of U.S. application Ser. No. 17/192,884, filed on Mar. 5, 2021, which is a continuation application of U.S. application Ser. No. 16/746,960, filed on Jan. 20, 2020, which in turn claims priority to Chinese Application No. 201910072565.3 filed on Jan. 25, 2019, all of which are incorporated herein by reference in their entireties.

TECHNICAL FIELD

The present disclosure relates to a connector assembly, more particularly, the present disclosure relates to a connector assembly with a wire-end connector.

BACKGROUND ART

Chinese patent application issuance publication No. CN207868438 U discloses a technical means that uses a plurality of shield covers to improve the electrical performance of a system. In the present disclosure, the shield cover may include a retention tab which engages with a retention aperture of a ground terminal plate and the shield cover can thus be mounted in place with a friction/interference fit. Or, alternatively, the shield cover may be connected by a solder or fusion welding operation or by using a conductive adhesive. Furthermore, the shield cover is placed over a signal terminal pair which includes a first signal terminal and a second signal terminal, so that the shield cover is connected to the ground terminal plate. However, the shield cover may only improve crosstalk between adjacent signal terminal pairs but not suppress crosstalk between twin-ax cables.

The above description of the "background" merely provides a background, and it is not admitted that the above description of "background" discloses the subject matter of the present disclosure, and the above description of "background" does not constitute the background of the present disclosure, any above description of the "background" should not be considered as any part of the present disclosure.

SUMMARY

An object of the present disclosure is to provide a connector assembly to overcome shortcoming and deficiency in the prior art.

An embodiment of the present disclosure provides a connector assembly. The connector assembly comprises a wire-end connector. The wire-end connector comprises a wire-end connector, a shield plate and a twin-ax cable. The wafer comprises a frame and a terminal group. The terminal group is configured to be supported in the frame. The terminal group comprises a signal terminal pair and a ground plate. The ground plate is configured to provide a ground terminal on each of both sides of the signal terminal pair. The shield plate is configured to be connected to the ground plate. The shield plate comprises an opening penetrating the shield plate. The twin-ax cable comprises a pair of conductors and a ground portion. The pair of conductors extend through the opening of the shield plate and connect the signal terminal pair.

The ground portion electrically connects at least one of the shield plate and the ground plate.

In some embodiments, the shield plate is provided near a connection location of the twin-ax cable and the terminal group.

In some embodiments, the ground portion of the twin-ax cable is a metal shielding layer or a drain wire.

In some embodiments, the opening of the shield plate is a closed hole, the closed hole completely encircles the twin-ax cable.

In some embodiments, the shield plate is positioned between the terminal group and the twin-ax cable.

In some embodiments, the terminal group and the shield plate are both positioned in the frame.

In some embodiments, the terminal group and the shield plate are both provided in the frame by an insert molding manner.

In some embodiments, the shield plate comprises a protrusion, the protrusion has a contact flat surface, the contact flat surface abuts the ground plate.

In some embodiments, the wire-end connector is a first wire-end connector, the connector assembly further comprises a second wire-end connector and a housing. The second wire-end connector is arranged side by side with the first wire-end connector. The housing is configured to assemble the first wire-end connector and the second wire-end connector.

In some embodiments, when the ground portion electrically connects the ground plate, the ground portion extends through the opening of the shield plate.

In some embodiments, the frame further comprises at least one ground plate fixed portion, and the ground plate further comprises at least one fixing hole penetrating the ground plate, the ground plate fixed portion of the frame extends through the corresponding fixing hole of the ground plate.

In some embodiments, the frame further comprises at least one terminal fixed portion, and each signal terminal of the signal terminal pair comprises a fixing hole penetrating the signal terminal, the terminal fixed portion of the frame extends through the fixing hole of the corresponding the signal terminal pair.

In the present disclosure, only a single shield plate can be used to provide good shielding for the terminal group and the twin-ax cable at the same time. Furthermore, the twin-ax cable and the terminal group share the shield plate which provides a grounding function, so that components are reduced, space and costs are saved. Moreover, the shield plate includes an opening, and the twin-ax cable passes through the opening, so that at least a portion of the shield plate encircles the twin-ax cable. Thus, it can reduce electric field leakage caused by the twin-ax cable.

The technical features and advantages of the present disclosure are widely and generally described as above, so the detailed description of the present disclosure can be better understood. Other technical features and advantages constituting the subject matters of the claims of the present disclosure will be described below. It is to be understood by those of ordinary skill in the art that, the concept and specific embodiments disclosed below may be quite easily used to make modification or design other configuration or process to realize the same objects of the present disclosure. It is to be understood by those of ordinary skill in the art that these equivalent configurations can not depart from the spirit and scope of the present disclosure as defined by the appended claims.

BRIEF DESCRIPTION OF THE DRAWINGS

Referring to the detailed description and the claims in combination with the drawings, the disclosed contents of the present disclosure can be fully understood, the same reference numeral indicates the same element in the drawings.

DETAILED DESCRIPTION OF THE PREFERRED EMBODIMENTS

Figure 1:
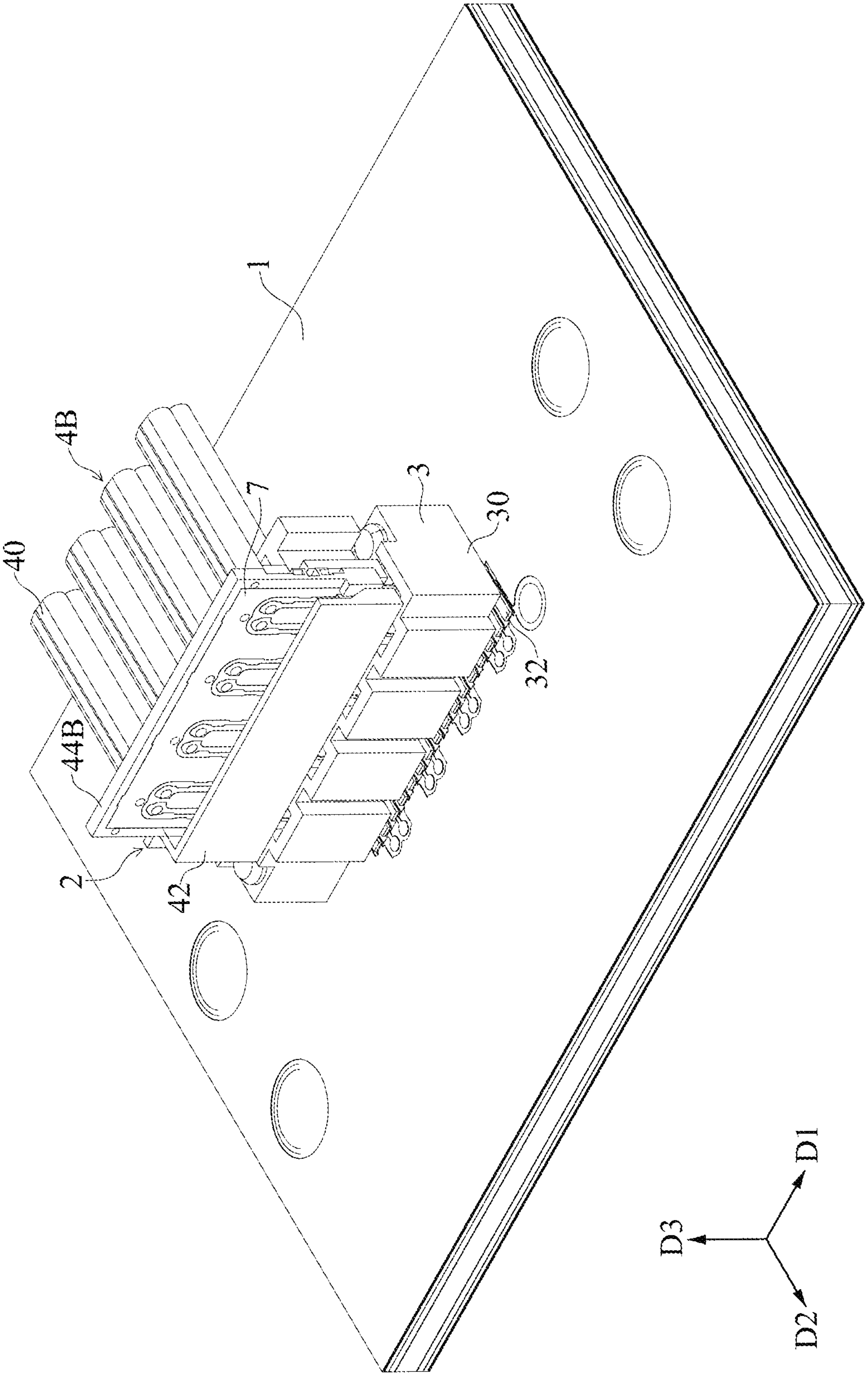
FIG. 1 is an assembled perspective schematic view of a circuit board, a connector assembly and a board-end connector.

Embodiments or examples of the content of the present disclosure shown in the drawings are described using a specific language. It is to be understood that this is not intended to limit the scope of the present disclosure. Any variations or modifications of the described embodiments, as well as any further applications of the principles described herein, will normally occur to those skilled in the art. The reference numerals may be repeated in each embodiment, but even if the elements have the same reference numeral, the features in the embodiment are not necessarily used in another embodiment.

It will be understood that the various elements, assemblies, regions, layers or sections may be described herein using the terms first, second, third, etc., however, these elements, assemblies, regions, layers or sections are not limited to these terms. These terms are only used to distinguish one element, assembly, region, layer or section from another element, assembly, region, layer or section. The first element, assembly, region, layer or section described below may be referred to as a second element, assembly, region, layer or section without departing from the teachings of the inventive concept of the present disclosure.

The words used in the present disclosure are only used for the purpose of describing the specific exemplary embodiments and are not intended to limit the concept of the present disclosure. As used herein, "a" and "the" in singular are also used to contain plural, unless otherwise expressly indicated herein. It is to be understood that the word "include" used in the specification specifically indicates the existence of a feature, integer, step, operation, element or assembly which is described, but does not excludes the existence of one or more other features, integers, steps, operations, elements, assemblies or groups thereof.

Figure 2:
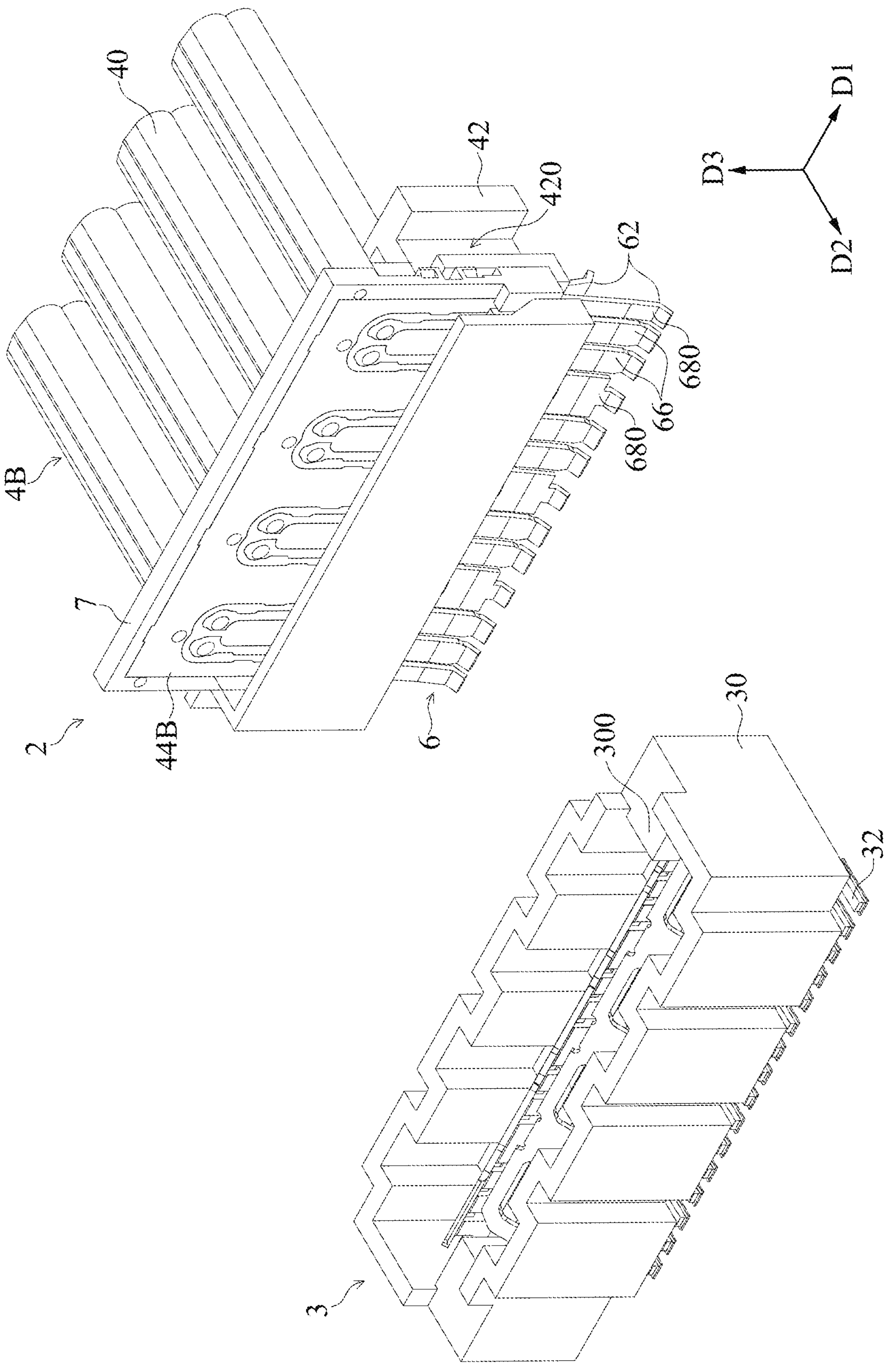
FIG. 2 is an exploded perspective schematic view of the connector assembly and the board-end connector of FIG. 1.

FIG. 1 is an assembled perspective schematic view of a circuit board, a connector assembly and a board-end connector. FIG. 2 is an exploded perspective schematic view of the connector assembly and the board-end connector of FIG. 1. Referring to FIG. 1 and FIG. 2, the connector assembly 2 is inserted into the board-end connector 3 and is electrically connected to the circuit board 1 via the board-end connector 3.

Figure 3:
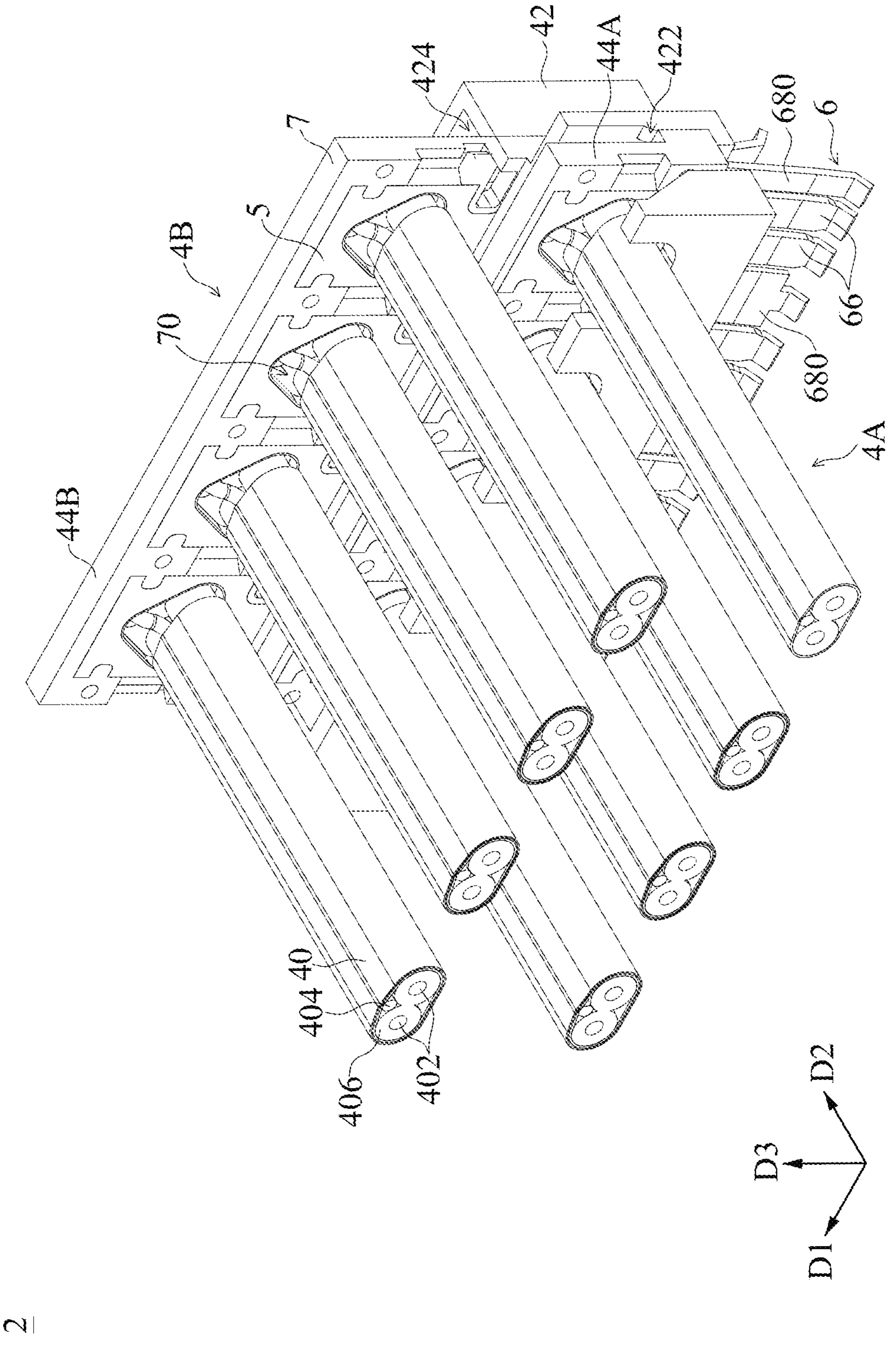
FIG. 3 is an assembled perspective schematic view of the connector assembly of FIG. 2.
Figure 4:
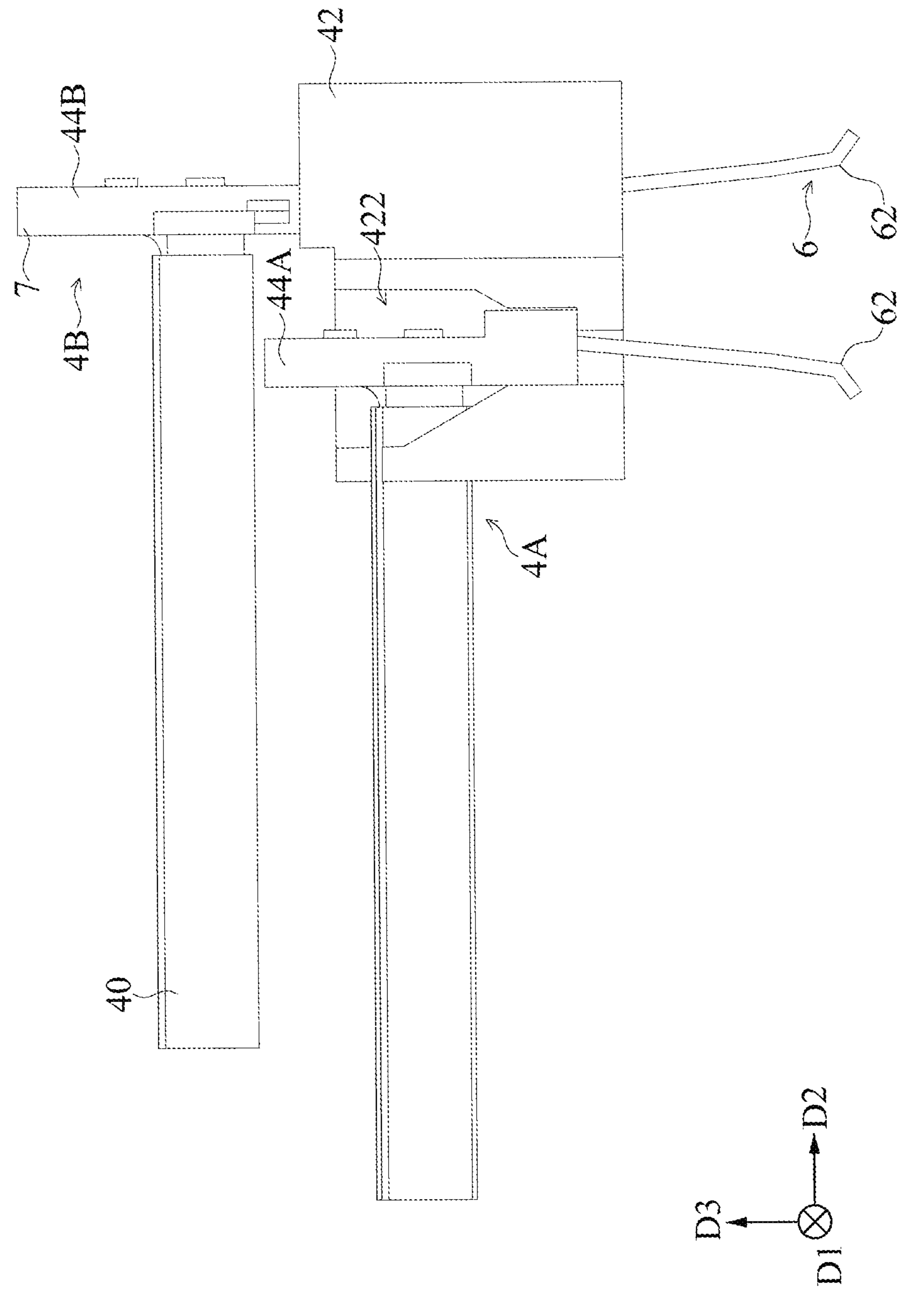
FIG. 4 is a side plan schematic view of the connector assembly of FIG. 3.
Figure 5:
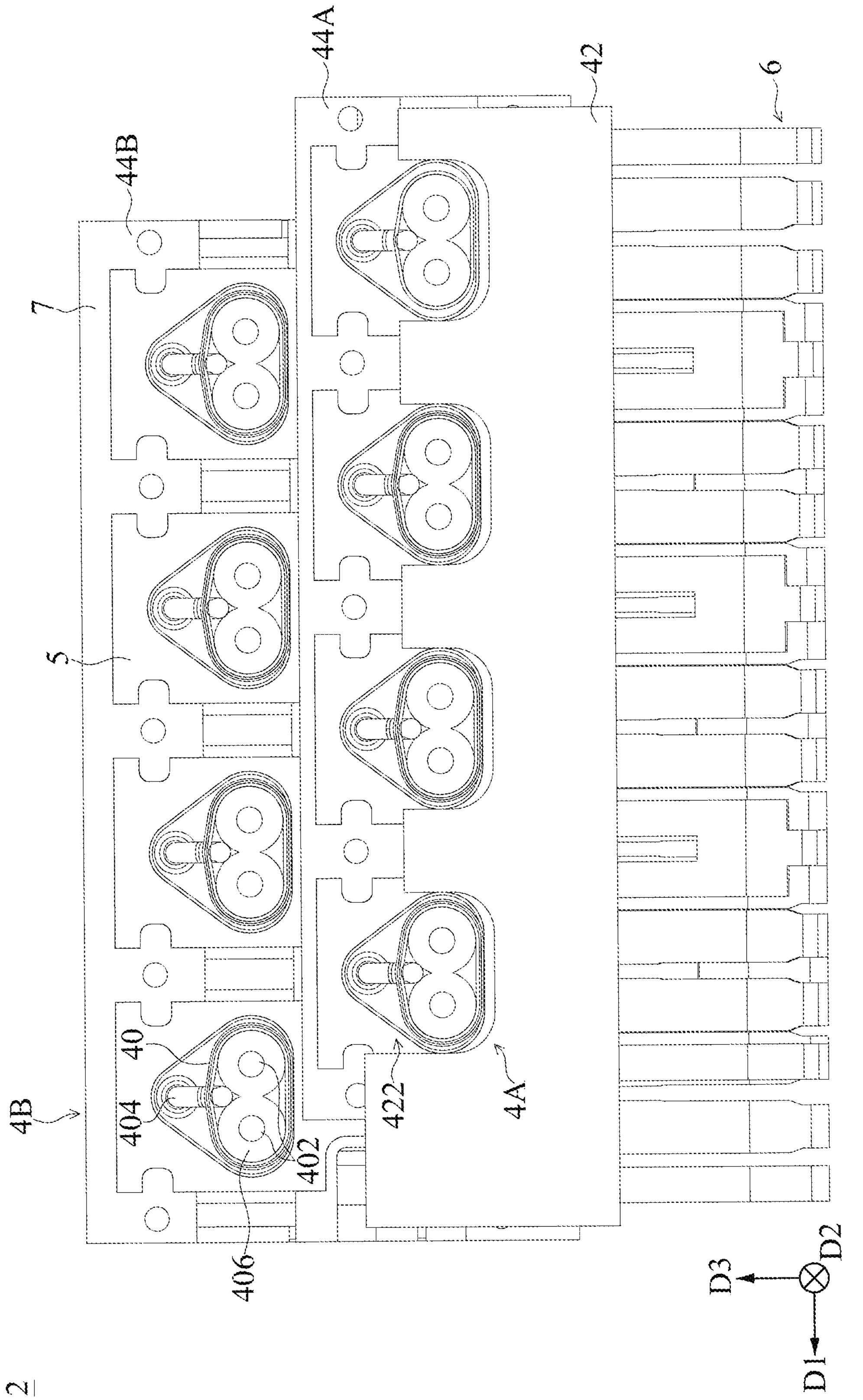
FIG. 5 is a plan schematic view of the connector assembly of FIG. 3 viewed from inside to outside.

FIG. 3 is an assembled perspective schematic view of the connector assembly of FIG. 2. FIG. 4 is a side plan schematic view of the connector assembly of FIG. 3. FIG. 5 is a plan schematic view of the connector assembly of FIG. 3 viewed from inside to outside. Referring to FIG. 3 to FIG. 5, the connector assembly 2 includes at least one wire-end connector and a housing 42. The housing 42 is elongated and extends in a length direction D1 and has a width in a width direction D2 and a height in a height direction D3. In the present embodiment, the connector assembly 2 includes a first wire-end connector 4A and a second wire-end connector 4B. The first wire-end connector 4A and the second wire-end connector 4B are independent of each other and can be individually inserted into the board-end connector 3 of FIG. 2. In some embodiments, the housing 42 can be removed. In some embodiments, the connector assembly 2 includes one of the first wire-end connector 4A and the second wire-end connector 4B.

Referring back to FIG. 2, the housing 42 includes a guiding block receiving space 420. When the connector assembly 2 is inserted into the board-end connector 3 in the height direction D3, a guiding block 300 of a plug housing 30 of the board-end connector 3 will guide the guiding block receiving space 420 of the housing 42.

Figure 6:
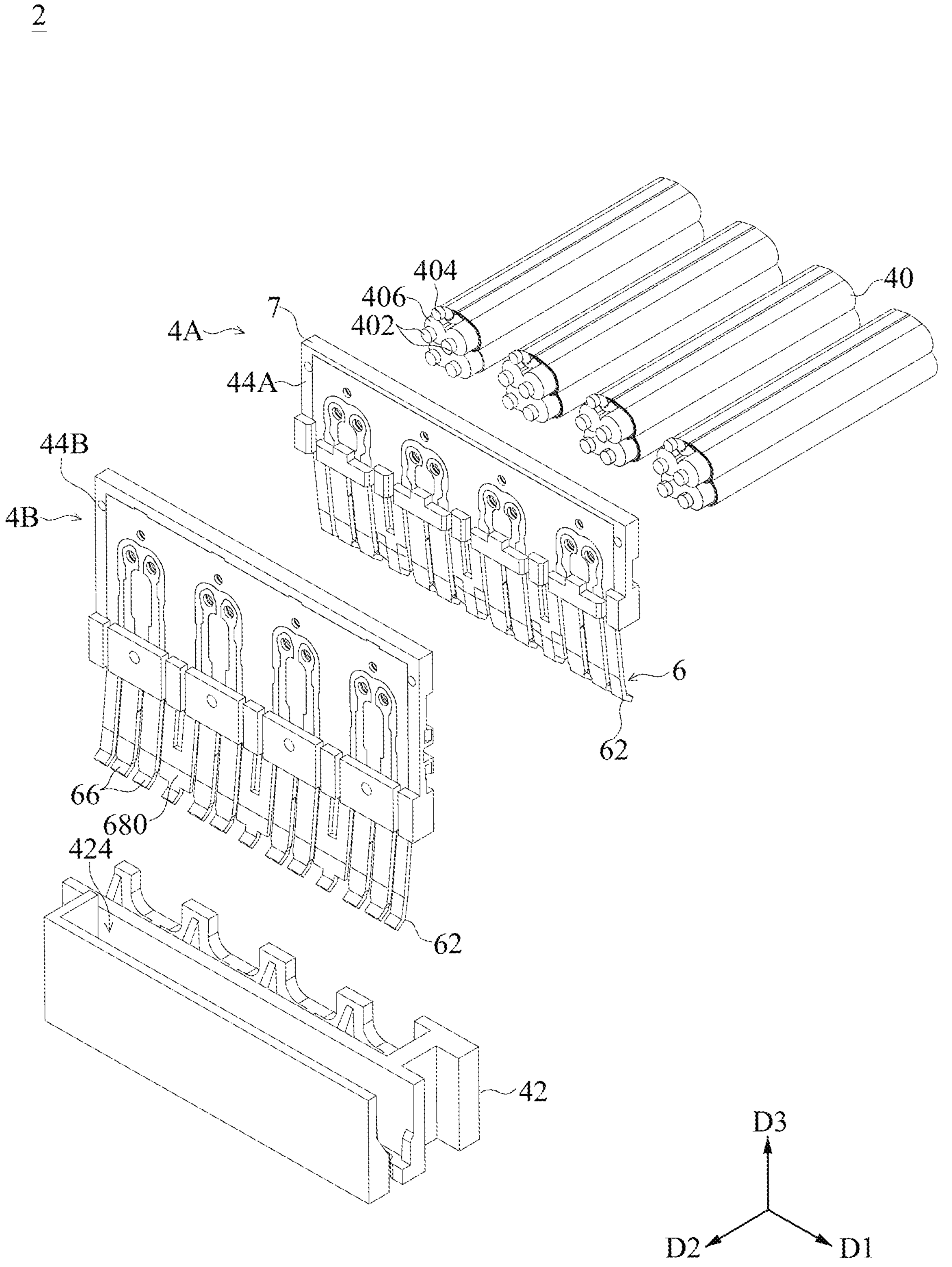
FIG. 6 is an exploded perspective schematic view of the connector assembly of FIG. 3.
Figure 7:
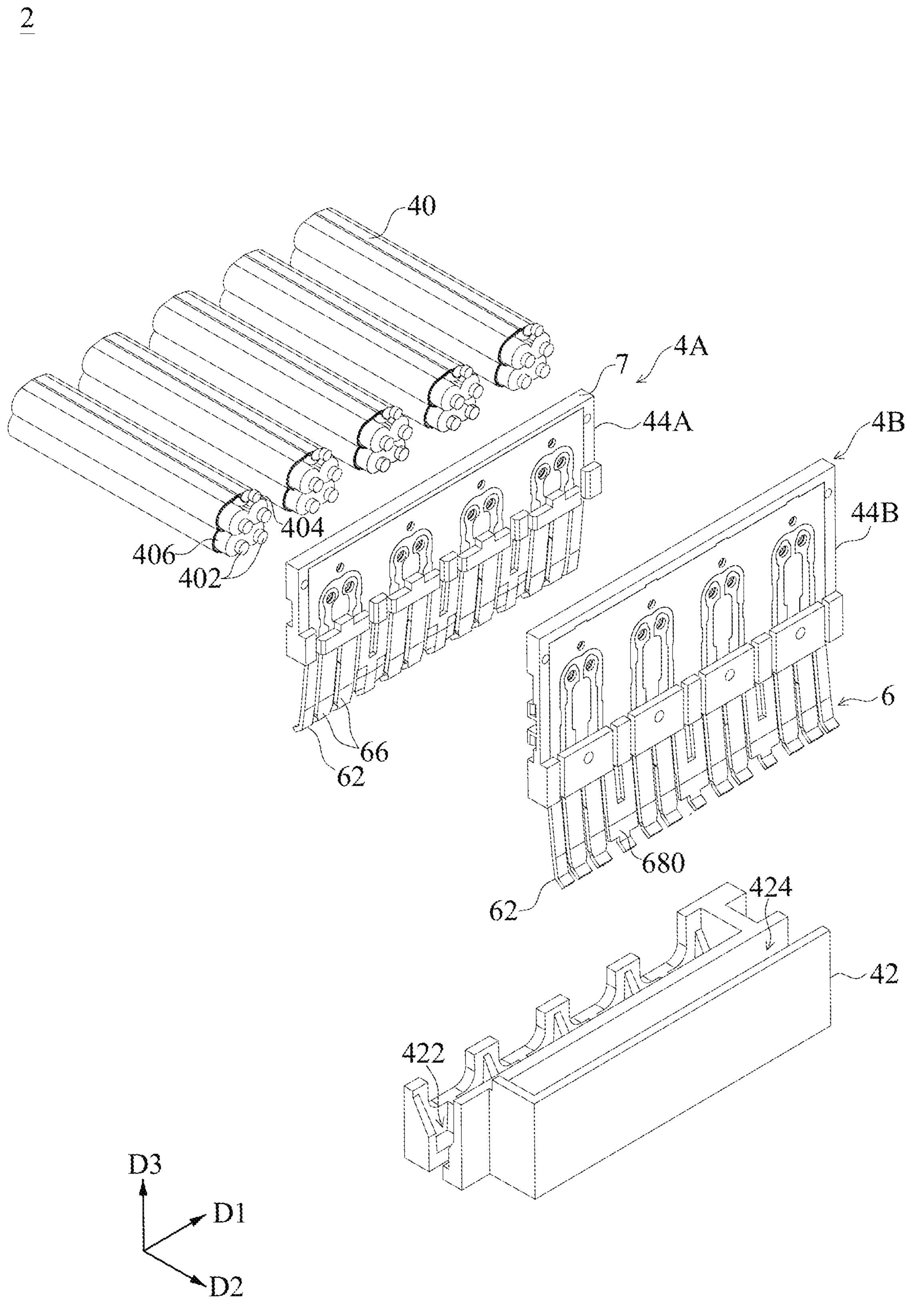
FIG. 7 is an exploded perspective schematic view of the connector assembly of FIG. 6 from another angle.

FIG. 6 is an exploded perspective schematic view of the connector assembly of FIG. 3. FIG. 7 is an exploded perspective schematic view of the connector assembly of FIG. 6 from another angle. Referring to FIG. 6 and FIG. 7, the first wire-end connector 4A and the second wire-end connector 4B are arranged side by side and share one housing 42. The housing 42 is configured to assemble the first wire-end connector 4A and the second wire-end connector 4B.

The first wire-end connector 4A includes a twin-ax cable 40 and a wafer 44A. The twin-ax cable 40 is electrically connected to the wafer 44A. The wafer 44A is received in a first wafer receiving groove 422 of the housing 42 and is inserted into the board-end connector 3 and is electrically connected to the circuit board 1.

The second wire-end connector 4B includes a twin-ax cable 40 and a wafer 44B. The twin-ax cable 40 is electrically connected to the wafer 44B. The wafer 44B is received in a second wafer receiving groove 424 of the housing 42 and is inserted to the board-end connector 3 and is electrically connected to the circuit board 1.

In the present embodiment, a size of the wafer 44B in the height direction D3 is larger than a size of the wafer 44A in the height direction D3. However, the present disclosure is not limited thereto. In some embodiments, the size of the wafer 44B in the height direction D3 is equal to the size of the wafer 44A in the height direction D3.

Figure 8:
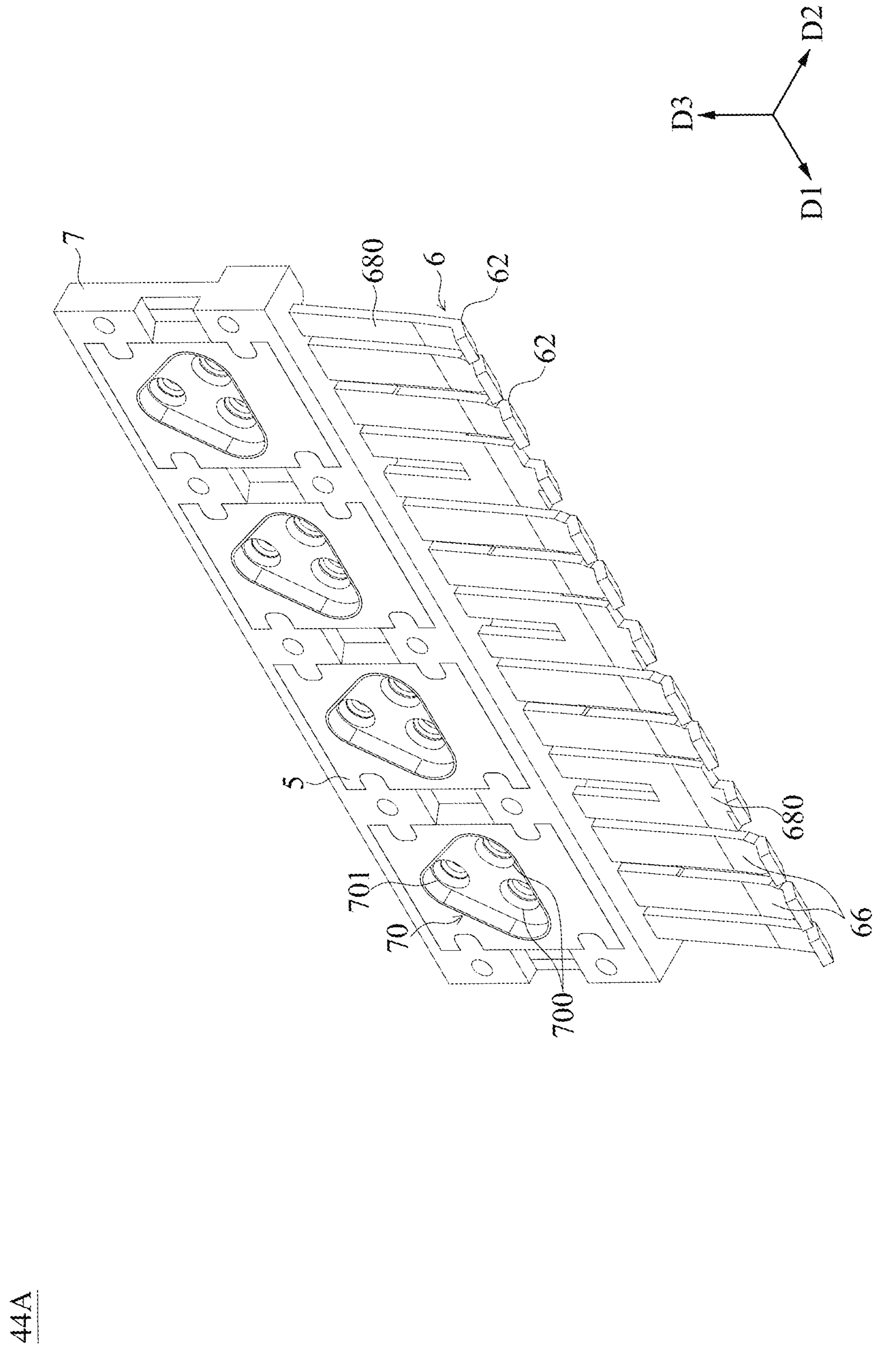
FIG. 8 is a assembled perspective schematic view of a wafer of a first wire-end connector of FIG. 3.
Figure 9:
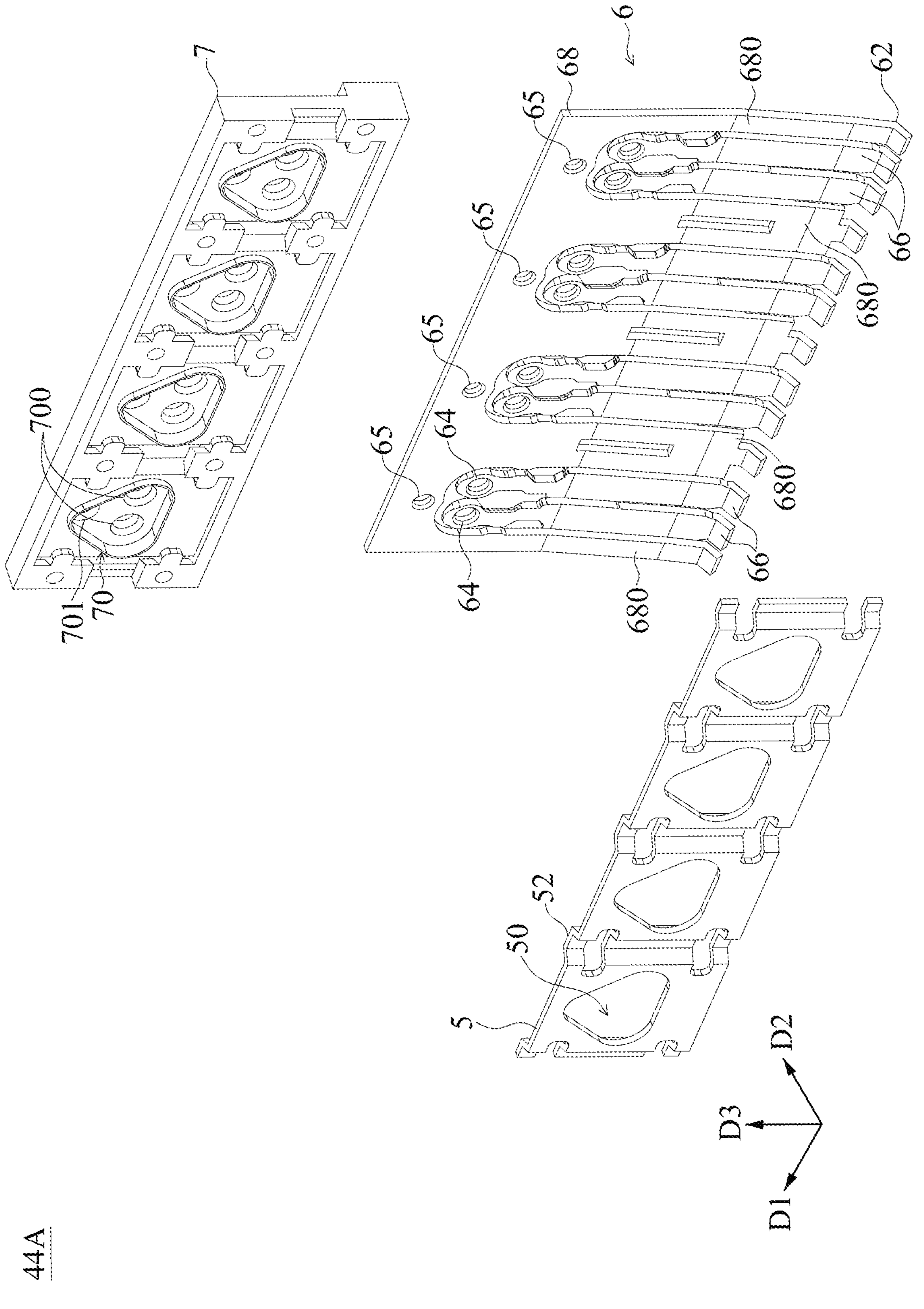
FIG. 9 is an exploded perspective schematic view of the wafer of FIG. 8.

FIG. 8 is an assembled perspective schematic view of the wafer of the first wire-end connector of FIG. 3. FIG. 9 is an exploded perspective schematic view of the wafer of FIG. 8. Referring to FIG. 8 and FIG. 9, the wafer 44A includes a shield plate 5, a terminal group 6 and a frame 7. In the present embodiment, the shield plate 5 and the terminal group 6 are both positioned in the frame 7. In some embodiments, the shield plate 5 and the terminal group 6 are both provided in the frame 7 by insert molding.

The terminal group 6 is configured to be supported in the frame 7 and includes a plurality of signal terminal pairs 66 and a ground plate 68. The ground plate 68 is configured to provide a ground terminal 680 on both sides of the signal terminal pair 66 in the length direction D1. Signal terminals of the signal terminal pair 66 and the ground terminal 680 each include a contact portion 62. The contact portion 62 of the signal terminal and the contact portion 62 of the ground terminal 680 are electrically connected to terminals 32 of the board-end connector 3 (as shown in FIG. 2). Thus, the ground plate 68 can reduce crosstalk between two adjacent signal terminal pairs 66.

In the present embodiment, the ground plate 68 is a single plate body. However, the present disclosure is not limited thereto. In some embodiments, the ground plate 68 may include a plurality of separate plate bodies. Each plate body provides two ground terminals in the length direction D1 respectively on both sides of the corresponding signal terminal pair 66.

In the present disclosure, based on the wafer 44A and wafer 44B, a direction facing the twin-ax cable 40 is an inside direction, and a direction away from the twin-ax cable 40 is an outside direction.

Elements included in the second wire-end connector 4B are similar to the first wire-end connector 4A, with a difference that the contact portion 62 of the terminal group 6 of the first wire-end connector 4A faces the outside direction, while the contact portion 62 of the terminal group 6 of the second wire-end connector 4B faces the inside direction.

Figure 10:
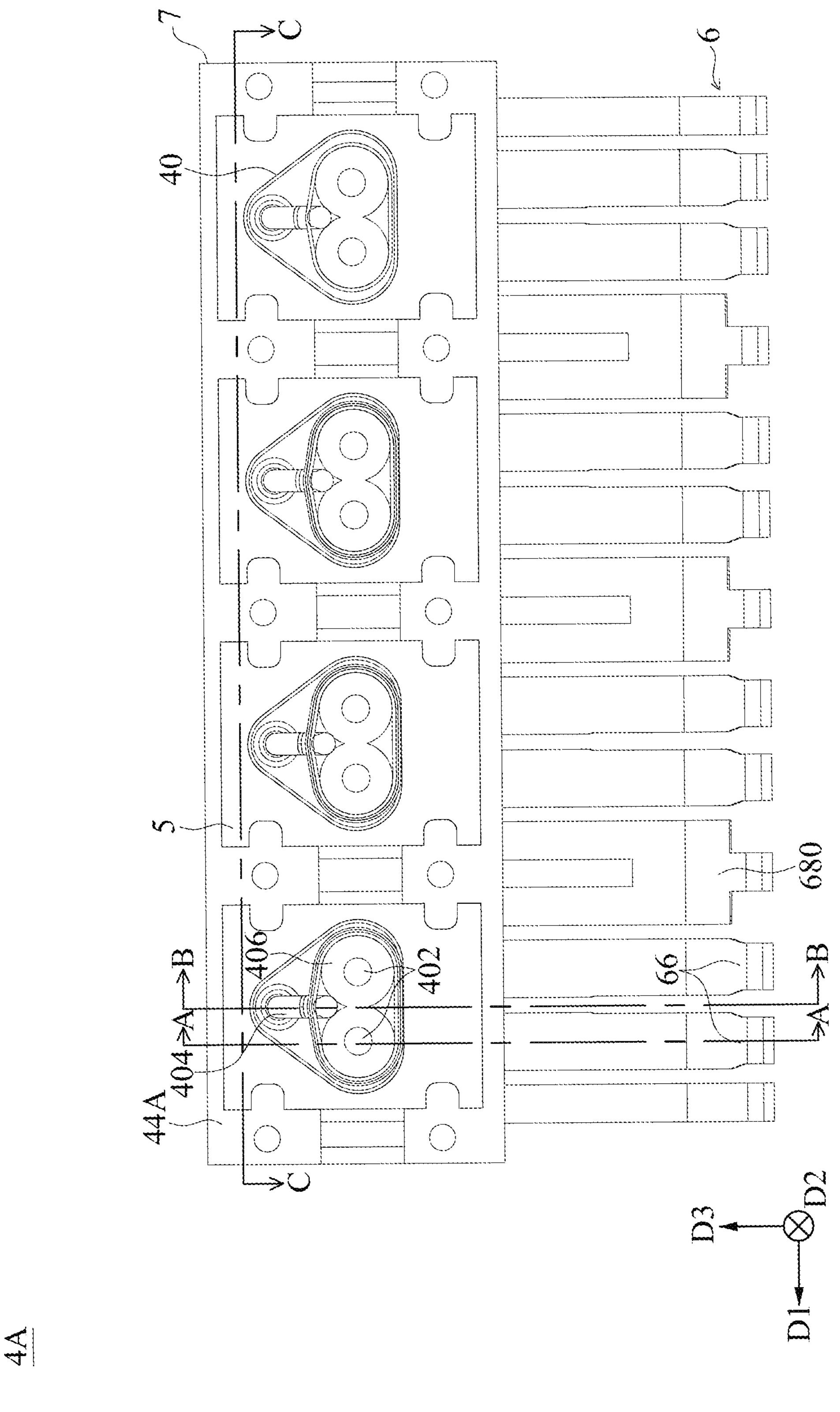
FIG. 10 is a plan schematic view of the first wire-end connector of FIG. 3 viewed from inside to outside.
Figure 11:
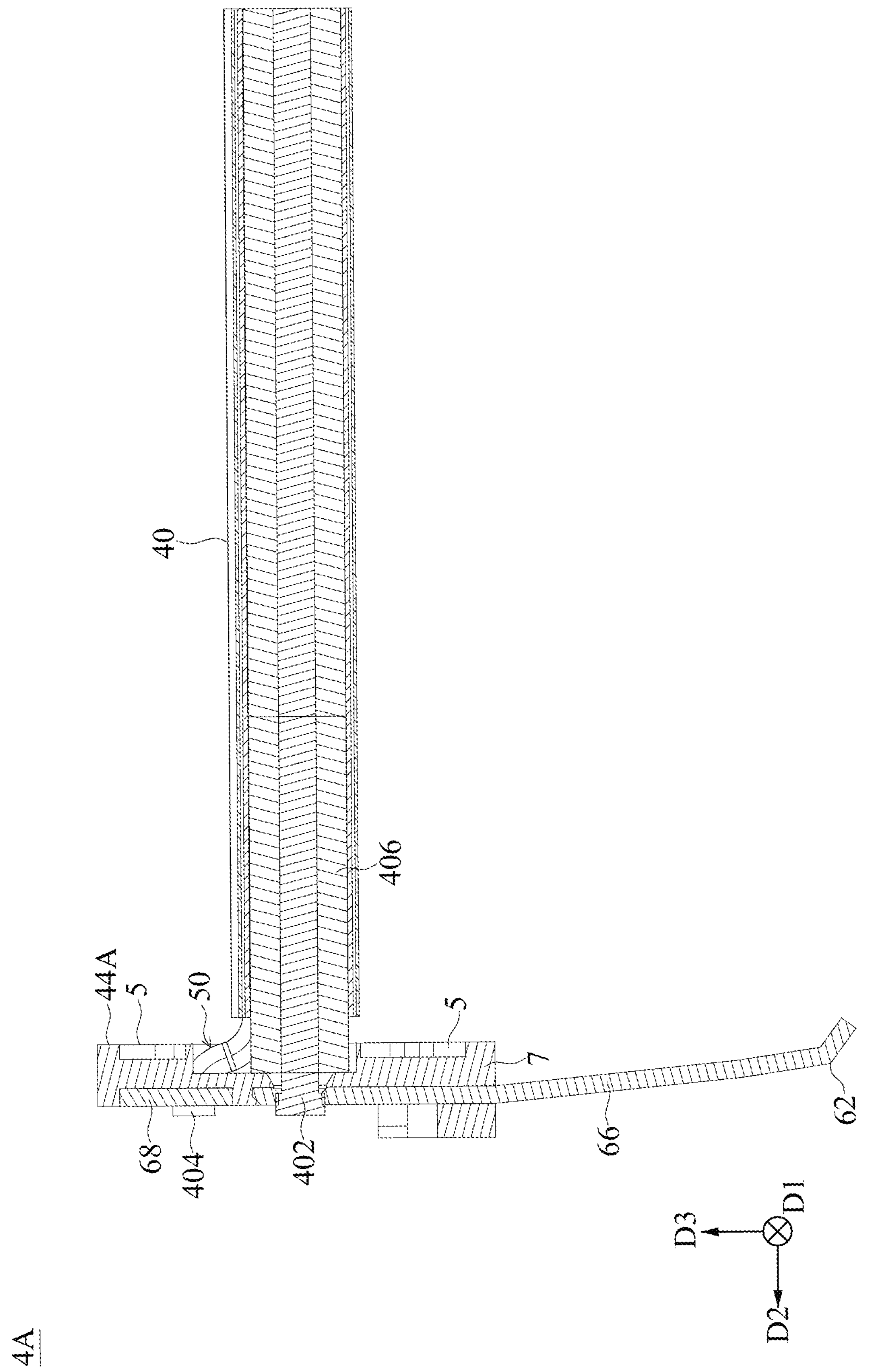
FIG. 11 is a cross-sectional plan schematic view of the first wire-end connector of FIG. 10 taken along a line A-A.

FIG. 10 is a plan schematic view of the first wire-end connector 4A of FIG. 3 from inside to outside. FIG. 11 is a cross-sectional plan schematic view of the first wire-end connector 4A of FIG. 10 taken along a line A-A. Referring to FIG. 10 and FIG. 11, the shield plate 5 includes an opening 50 penetrating the shield plate 5. The opening 50 is a closed hole. Specifically, the twin-ax cable 40 includes a pair of conductors 402, a ground portion 404 and an insulative material 406. The pair of conductors 402 are surrounded by the insulative material 406 and extend through the opening 50 of the shield plate 5 in the width direction D2 and connect to the signal terminal pair 66. The opening 50, which is a closed hole, completely encircles the twin-ax cable 40. Therefore, the opening 50, which is a closed hole, can better reduce the electric field leakage caused by the twin-ax cable 40. The shield plate 5 is provided near a connection location of the twin-ax cable 40 and the terminal group 6 and is positioned between the terminal group 6 and the twin-ax cable 40. In the present embodiment, the opening 50 of the shield plate 5 is a completely closed hole to completely encircle the twin-ax cable 40. However, the present disclosure is not limited thereto. In other embodiments, the opening 50 of the shield plate 5 may not be completely closed and thus partially encircle the twin-ax cable 40, thereby reducing the electric field leakage caused by the twin-ax cable 40.

Referring back to FIG. 9 and FIG. 11, in the present embodiment, the pair of conductors 402 respectively extend through frame apertures 700 of a recessed portion 70 of the frame 7 in the width direction D2 and are respectively connected to a pair of conductor apertures 64 of the signal terminal pair 66 in the width direction D2. Thus, the pair of conductors 402 are electrically connected with the signal terminal pair 66. Moreover, because of the recessed portion 70 of the frame 7, the insulative material 406 of the twin-ax cable 40 can be closer to the terminal group 6. In some embodiments, the frame 7 may not have the recessed portion 70.

With the structural configuration between the shield plate 5, the twin-ax cable 40 and the terminal group 6, the shield plate 5 can reduce the crosstalk between adjacent twin-ax cables 40 in addition to reducing the crosstalk between adjacent signal terminal pairs 66.

Figure 12:
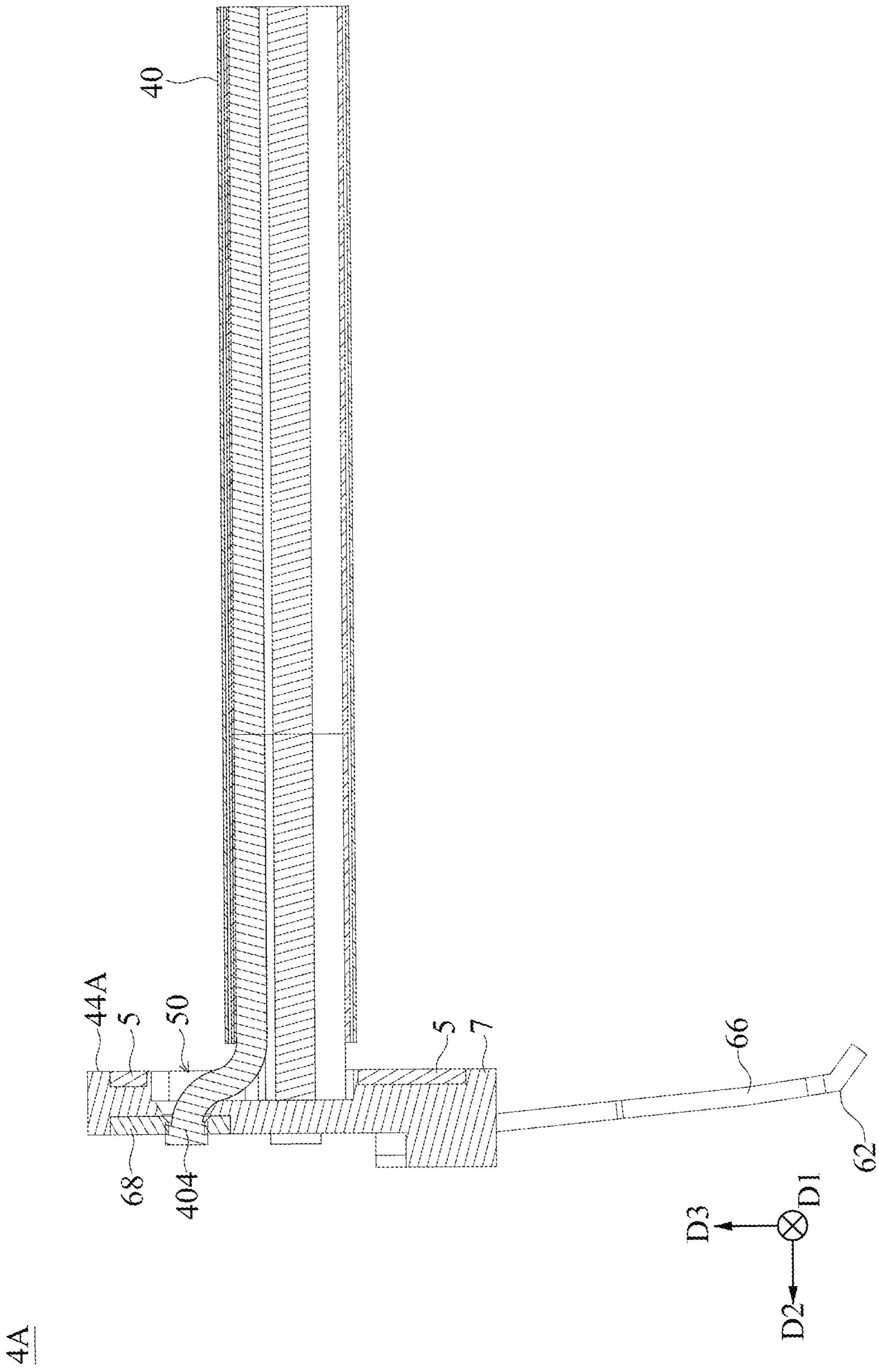
FIG. 12 is a cross-sectional plan schematic view of the first wire-end connector of FIG. 10 taken along a line B-B.

FIG. 12 is a cross-sectional plan schematic view of the first wire-end connector of FIG. 10 taken along a line B-B. Referring to FIG. 12, the ground portion 404 extends through the opening 50 of the shield plate 5 in the width direction D2 and is connected to the ground plate 68. In the present embodiment, the ground portion 404 is a drain wire, which extends through a frame ground aperture 701 of the recessed portion 70 of the frame 7 in the width direction D2 (as shown in FIG. 9), and is connected to a ground aperture 65 of the ground plate 68 in the width direction D2 (as shown in FIG. 9). Thus, the ground portion 404 is directly electrically connected with the ground plate 68. In some embodiments, the ground portion 404 of the twin-ax cable 40 is not directly electrically connected with the ground plate 68, but is directly connected to the shield plate 5, and the shield plate 5 is connected to the ground plate 68 by a solder or fusion welding operation or by using a conductive adhesive. In some embodiments, the ground portion 404 of the twin-ax cable 40 is a metal shielding layer or two or more drain wires.

Figure 13:
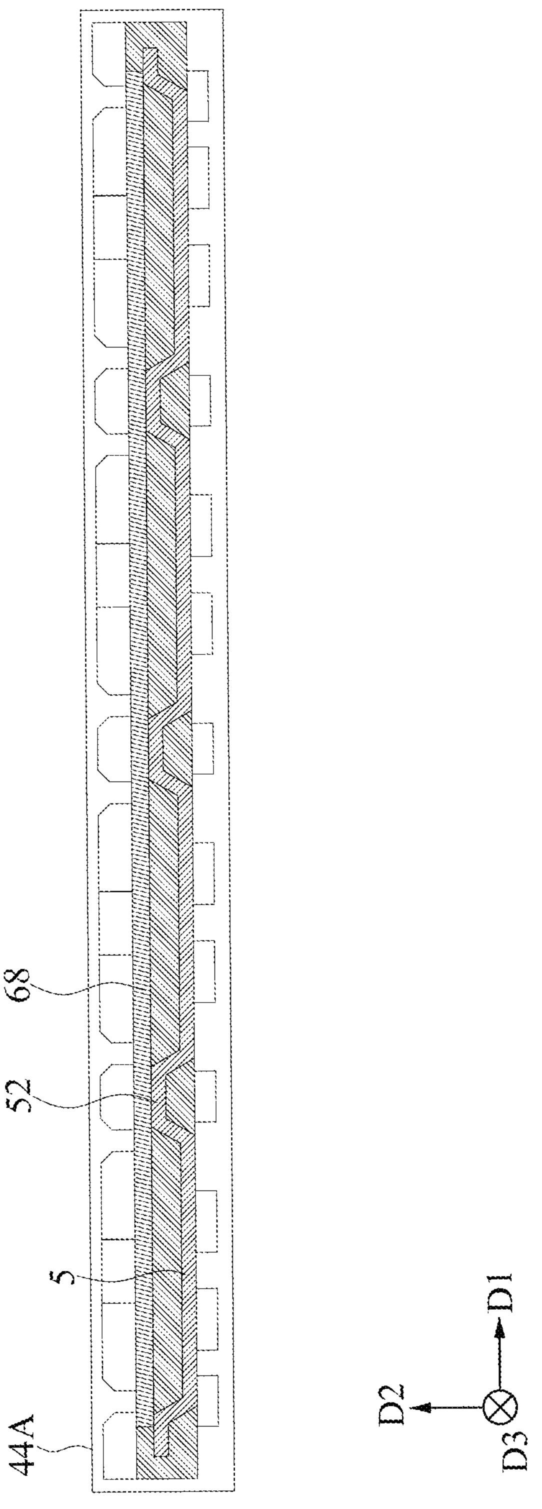
FIG. 13 is a cross-sectional plan schematic view of the first wire-end connector of FIG. 10 taken along a line C-C.

FIG. 13 is a cross-sectional plan schematic view of the first wire-end connector of FIG. 10 taken along a line C-C. Referring to FIG. 13, the shield plate 5 is configured to cover the ground plate 68 in the width direction D2, and is connected to the ground plate 68. Specifically, the shield plate 5 further includes a protrusion 52. The protrusion 52 has a contact flat surface, the contact flat surface abuts the ground plate 68. Thus, the shield plate 5 has the same ground reference point as the ground plate 68. However, the present disclosure is not limited thereto. In some embodiments, the shield plate 5 and the ground plate 68 are connected by a solder or fusion welding operation or by using a conductive adhesive.

Figure 14:
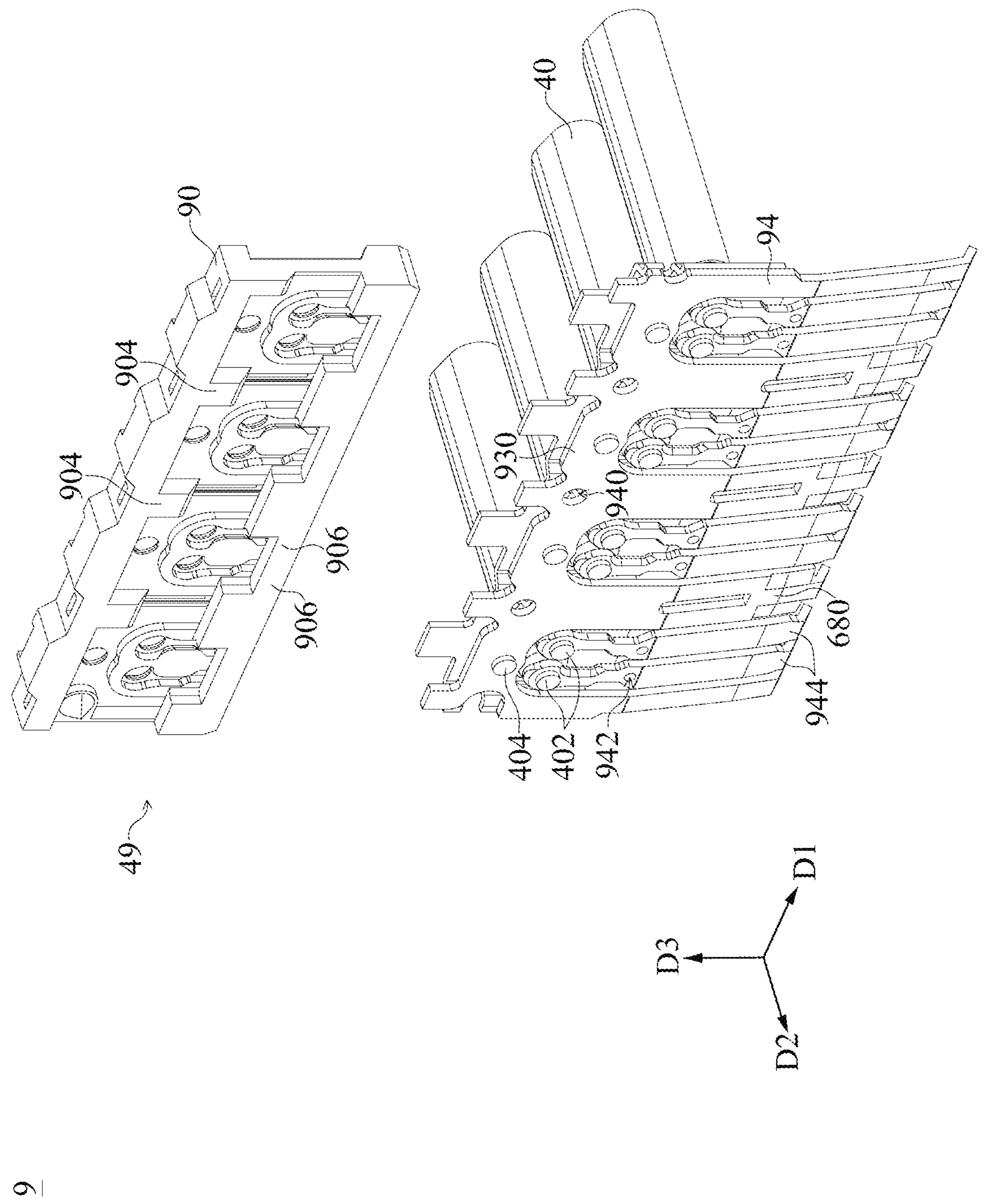
FIG. 14 is an exploded perspective schematic view of another embodiment of the wire-end connector.

FIG. 14 is an exploded perspective schematic view of another embodiment of the wire-end connector. Referring to FIG. 14, the wire-end connector 9 is similar to the first wire-end connector 4A of FIG. 3, with a difference that the wire-end connector 9 includes a wafer 49.

The wafer 49 includes a frame 90 and a terminal group 94. The terminal group 94 includes a plurality of signal terminal pairs 944 and a ground plate 930. The ground plate 930 includes at least one fixing hole 940 penetrating the ground plate 930. The present embodiment includes three fixing holes 940. Each signal terminal of the signal terminal pair 944 includes a fixing hole 942 penetrating the signal terminal.

The frame 90 includes at least one ground plate fixed portion 904 and at least one terminal fixed portion 906. The present embodiment includes three ground plate fixed portions 904 and four terminal fixed portions 906.

Figure 15:
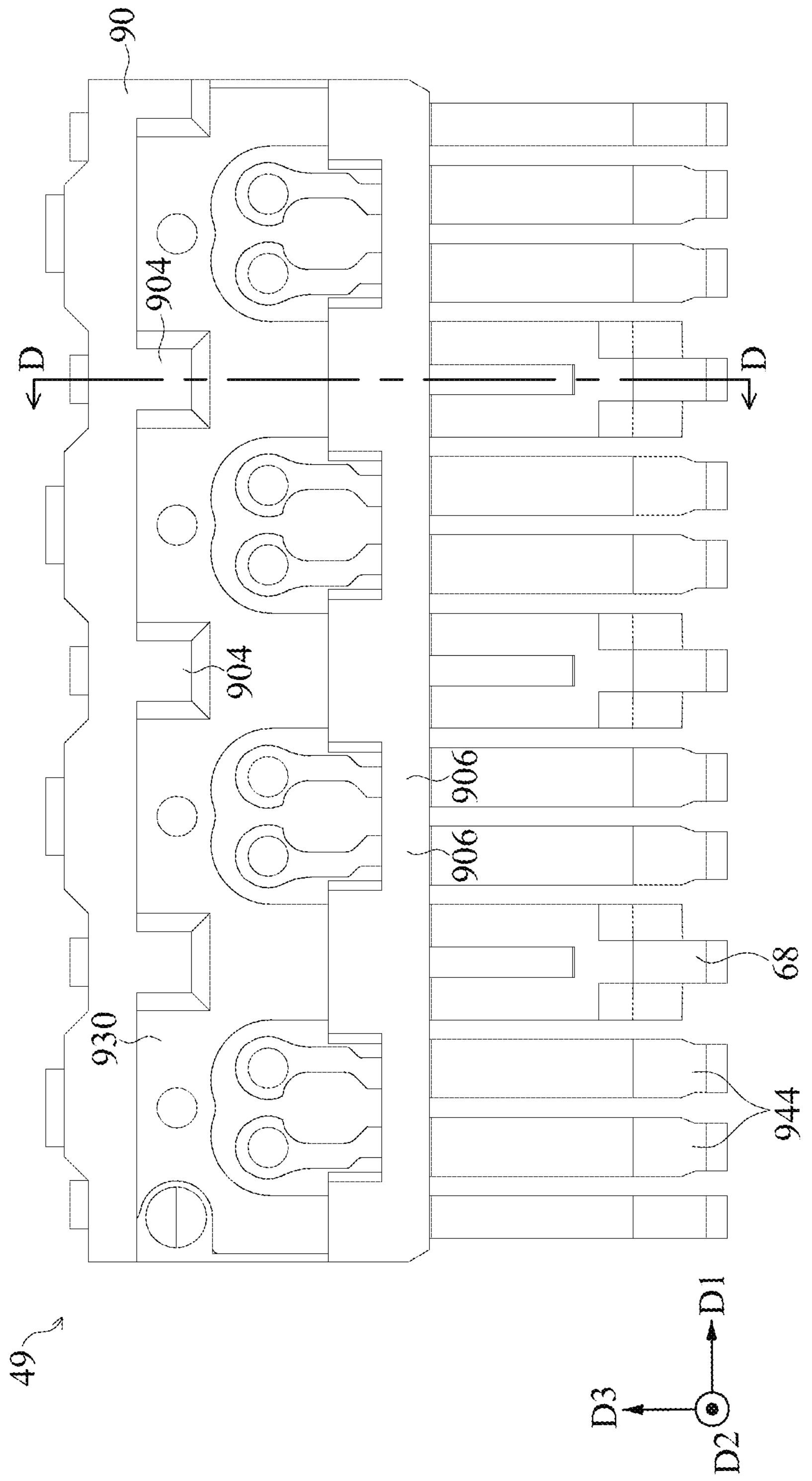
FIG. 15 is an assembled plan schematic view of the wire-end connector of FIG. 14 viewed from outside to inside.
Figure 16:
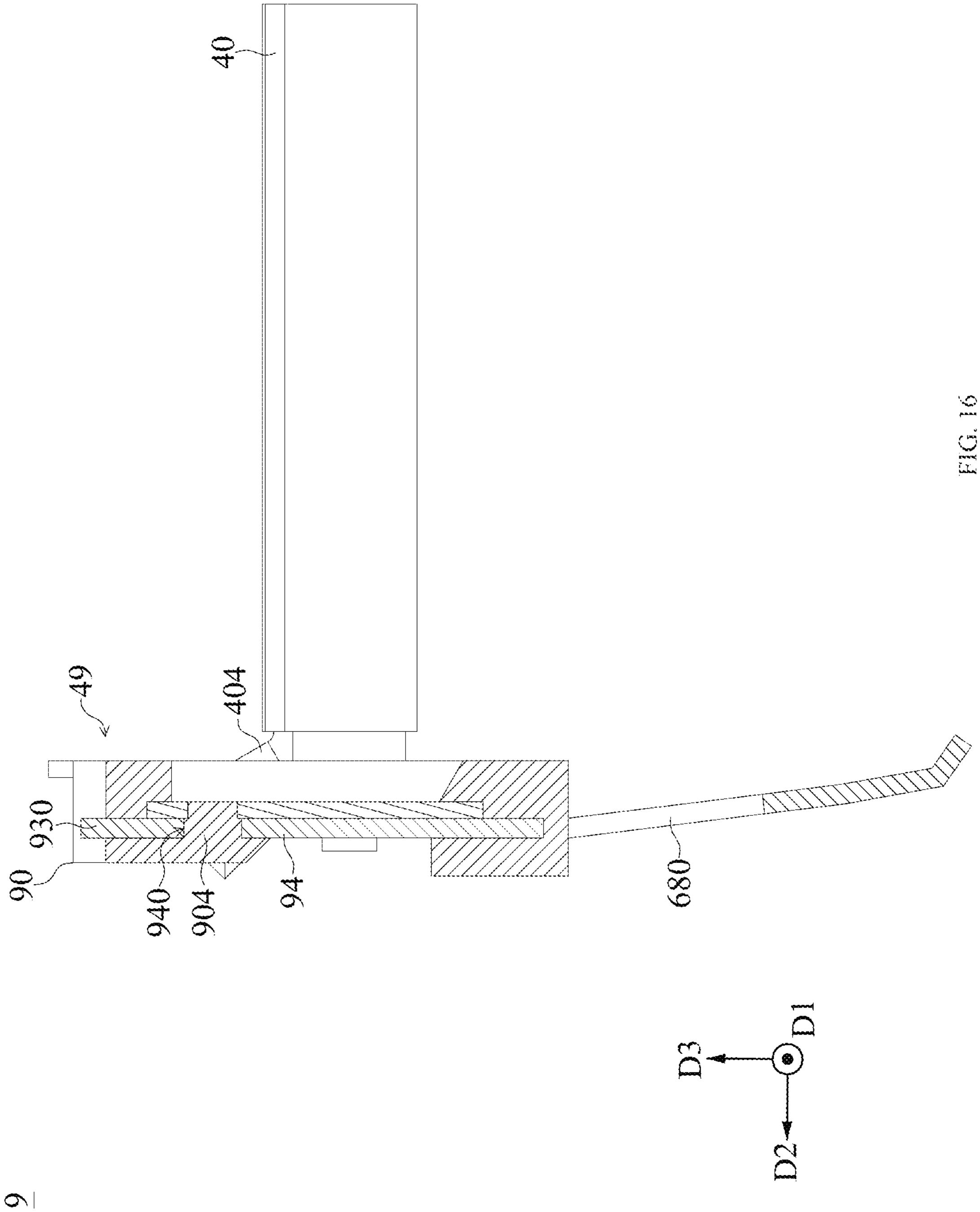
FIG. 16 is a cross-sectional plan schematic view of the wire-end connector of FIG. 15 taken along a line D-D.

FIG. 15 is an assembled plan schematic view of the wire-end connector of FIG. 14 viewed from outside to inside. FIG. 16 is a cross-sectional plan schematic view of the wire-end connector of FIG. 15 taken along a line D-D.

Referring to FIG. 15 and FIG. 16, each ground plate fixed portion 904 of the frame 90 extends through the corresponding fixing hole 940 of the ground plate 930 in the width direction D2 so as to be fixed in the fixing hole 940. For example, in the insert molding process, a plastic that makes the frame body 90 flows through each fixing hole 940 of the ground plate 930. After the plastic is cured, each ground plate fixed portion 904 includes a portion of the plastic formed in each fixing hole 940.

Similarly, each terminal fixed portion 906 of the frame 90 extends through each fixing hole 942 of the corresponding signal terminal pair 944 in the width direction D2 so as to be fixed in the fixing hole 942. For example, in the insert molding process, the plastic that makes the frame body 90 flows through each fixing hole 942 of the signal terminal. After the plastic is cured, each ground plate fixed portion 904 includes a portion of the plastic formed in each fixing hole 940.

Due to the engagement of the ground plate fixed portion 904 of the frame 90 with the fixing hole 940 and the engagement of the terminal fixed portion 906 with the fixing hole 942, the structure of the wafer 49 is more stable.

In some embodiments, the wafer 49 includes at least one of the fixing hole 940 and the fixing hole 942, the frame 90 correspondingly includes at least one of the ground plate fixed portion 904 and the terminal fixed portion 906.

In some embodiments, the ground plate 68, each signal terminal pair 66 and the frame 7 of at least one of the first wire-end connector 4A and the second wire-end connector 4B may be respectively replaced by the ground plate 930, the signal terminal pair 944 and the frame 90.

While the present disclosure and advantages thereof are described in detail, it is understood that various changes, replacements and substitutions may be made without departing from the spirit and scope of the present disclosure defined by the appended claims. For example, many processes described above can be implemented in a variety of ways, and many processes described above can be replaced with other processes or combinations thereof.

Further, the scope of the present disclosure is not limited to the specific embodiments of process, machinery, manufacturing, substance composition, means, method or step described in the specification. Those skilled in the art can understand from the disclosed contents of the present disclosure that existing or future developed process, machinery, manufacturing, substance composition, means, method or step which has the same function or achieve essentially the same result as the corresponding embodiment described herein can be used in accordance with the present disclosure. Accordingly, such a process, machinery, manufacturing, substance composition, mean, method or step is included in the technical solution of the present disclosure.

What is claimed is:

1. A connector assembly comprising:
- a wire-end connector comprising:
  - a wafer comprising:
    - a frame; and
    - a terminal group which is configured to be supported in the frame, the terminal group comprising:
      - a signal terminal pair; and
      - a ground plate which is configured to provide a ground terminal on both sides of the signal terminal pair; and
  - a shield plate which is configured to be electrically connected to the ground plate, the shield plate comprising an opening that penetrates the shield plate.

2. The connector assembly of claim 1, wherein the frame comprises at least one aperture.

3. The connector assembly of claim 2, wherein the at least one aperture is within a recessed portion of the frame.

4. The connector assembly of claim 1, wherein the opening of the shield plate is a closed hole.

5. The connector assembly of claim 1, wherein the opening of the shield plate is a partially closed hole.

6. The connector assembly of claim 1, wherein the terminal group and the shield plate are both positioned in the frame.

7. The connector assembly of claim 6, wherein the terminal group and the shield plate are both provided in the frame by insert molding.

8. The connector assembly of claim 1, wherein the shield plate comprises a protrusion, the protrusion has a contact flat surface, the contact flat surface abuts the ground plate.

9. The connector assembly of claim 1, wherein
- the wire-end connector is a first wire-end connector,
- the connector assembly further comprises:
  - a second wire-end connector arranged side by side with the first wire-end connector; and
  - a housing which is configured to assemble the first wire-end connector and the second wire-end connector.

10. The connector assembly of claim 1, wherein when a ground portion of a cable electrically connects to the ground plate, the ground portion extends into the opening of the shield plate.

11. The connector assembly of claim 1, wherein the frame further comprises at least one ground plate fixed portion, and the ground plate further comprises at least one fixing hole penetrating the ground plate, the ground plate fixed portion of the frame extends through the corresponding fixing hole of the ground plate.

12. The connector assembly of claim 1, wherein the frame further comprises at least one terminal fixed portion, and each signal terminal of the signal terminal pair comprises a fixing hole penetrating the signal terminal, the terminal fixed portion of the frame extends through the fixing hole of the corresponding signal terminal pair.

13. A connector assembly comprising:
- a frame;
- a terminal group supported in the frame, the terminal group comprising:
  - a signal terminal pair; and
  - a ground plate that includes a plurality of ground terminals with at least one ground terminal on each side of the signal terminal pair; and
- a shield plate electrically connected to the ground plate, the shield plate comprising an opening that penetrates the shield plate.

14. The connector assembly of claim 13, wherein the frame comprises at least one aperture.

15. The connector assembly of claim 14, wherein the at least one aperture is within a recessed portion of the frame.

16. The connector assembly of claim 13, wherein the opening of the shield plate is a closed hole.

17. The connector assembly of claim 13, wherein the opening of the shield plate is a partially closed hole.

18. The connector assembly of claim 13, wherein the terminal group and the shield plate are both positioned in the frame.

19. The connector assembly of claim 18, wherein the terminal group and the shield plate are both provided in the frame by insert molding.

20. The connector assembly of claim 13, wherein the shield plate comprises a protrusion, the protrusion has a contact surface that abuts the ground plate.

* * * * *